United States Patent [19]

Stewart

[11] Patent Number: 4,878,729
[45] Date of Patent: Nov. 7, 1989

[54] OPTICAL SWITCH

[75] Inventor: David G. Stewart, Livingstone, South Africa

[73] Assignee: Square D Company, Palatine, Ill.

[21] Appl. No.: 791,802

[22] Filed: Oct. 28, 1985

[51] Int. Cl.⁴ .............................................. G02B 6/32
[52] U.S. Cl. .................................. 350/96.18; 250/227; 350/96.20
[58] Field of Search ............... 350/96.15, 96.18, 96.19, 350/96.20; 250/227, 221, 231 R, 231 P, 551

[56] References Cited

U.S. PATENT DOCUMENTS

| | | | |
|---|---|---|---|
| 3,864,018 | 2/1975 | Miller | 350/96.20 |
| 3,999,074 | 12/1976 | Callaghan | 250/551 |
| 4,033,669 | 7/1977 | Hanson | 350/96.20 |
| 4,046,454 | 9/1977 | Pugh, III | 350/96.20 |
| 4,124,271 | 11/1978 | Green | 350/96.20 |
| 4,134,640 | 1/1979 | Auracher et al. | 350/96.15 |
| 4,148,558 | 4/1979 | Schuck | 350/96.20 |
| 4,220,396 | 9/1980 | Antell | 350/96.15 |
| 4,223,217 | 9/1980 | Bongard et al. | 250/227 |
| 4,223,978 | 9/1980 | Kummer et al. | 350/96.20 |
| 4,239,331 | 12/1980 | Aoyama | 350/96.20 |
| 4,303,303 | 12/1982 | Aoyama | 350/96.20 |
| 4,305,006 | 12/1981 | Walthall et al. | 250/221 X |
| 4,322,126 | 3/1982 | Minowa et al. | 350/96.20 |
| 4,368,167 | 1/1987 | Leseure | 250/551 |
| 4,407,562 | 10/1983 | Young | 350/96.20 |
| 4,415,228 | 11/1983 | Stanley | 350/96.20 |
| 4,427,879 | 1/1984 | Becher et al. | 250/551 X |
| 4,434,363 | 2/1984 | Yorifuji et al. | 250/221 X |
| 4,470,662 | 9/1984 | Mumzhiu | 350/96.15 |
| 4,530,567 | 7/1985 | Simon | 250/551 X |
| 4,589,726 | 5/1986 | Buhrer | 350/96.20 |
| 4,636,030 | 1/1987 | Carter et al. | 350/96.19 X |

FOREIGN PATENT DOCUMENTS

| | | | |
|---|---|---|---|
| 0020874 | 1/1981 | European Pat. Off. | 350/96.13 |
| 0111807 | 9/1981 | Japan | 350/96.13 |

OTHER PUBLICATIONS

"Engineers Relay Handbook", p. 6, Published by National Association of Relay Manufacturers by Elkhart Copyright 1965, Dated 1980.

Primary Examiner—William L. Sikes
Assistant Examiner—Akm E. Ullah
Attorney, Agent, or Firm—James E. Lowe, Jr.; A. Sidney Johnston

[57] ABSTRACT

The invention provides a simple optical switch capable of integration with common machine tool control devices such as push buttons, limit switches, and pressure responsive switches. The invention is an optical switch comprising a housing for mounting the optical switch, a drive rod capable of motion, and at least one mirror surface movable with the drive rod for reflecting light in a desired direction.

5 Claims, 10 Drawing Sheets

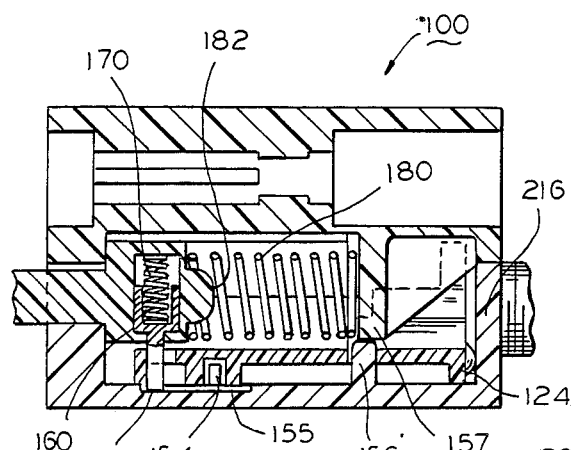
FIG.7
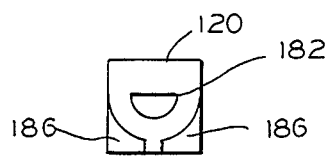
FIG.6
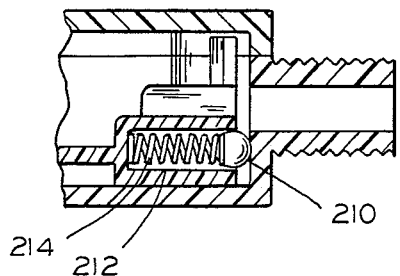
FIG.8
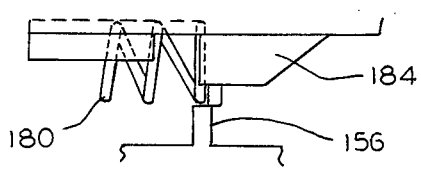
FIG.7A
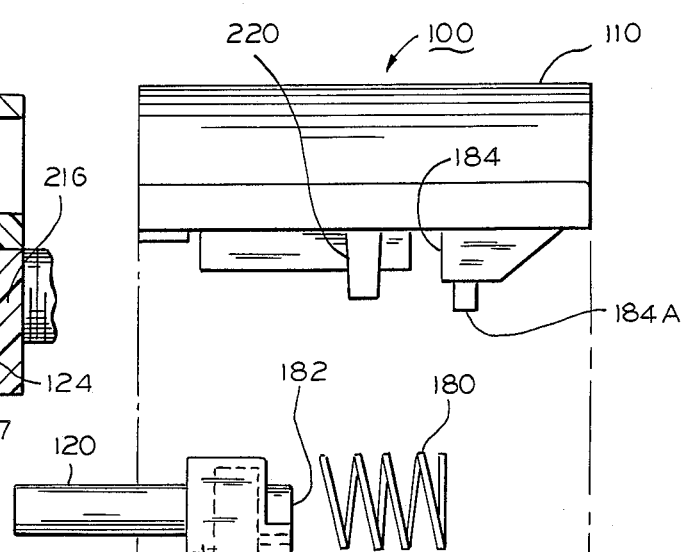
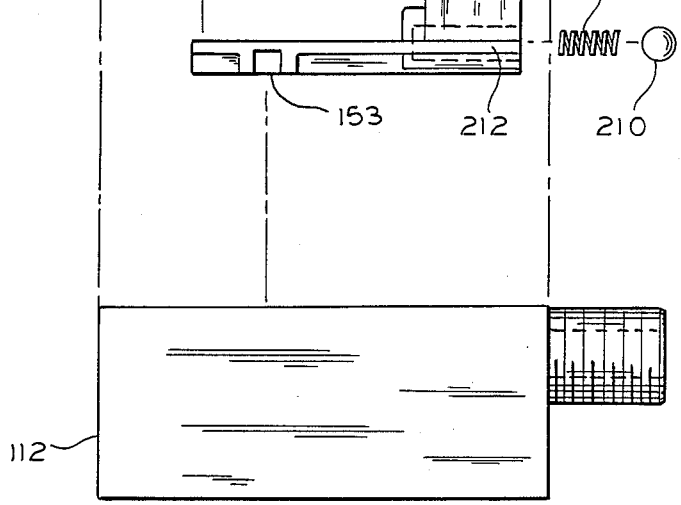
FIG.5

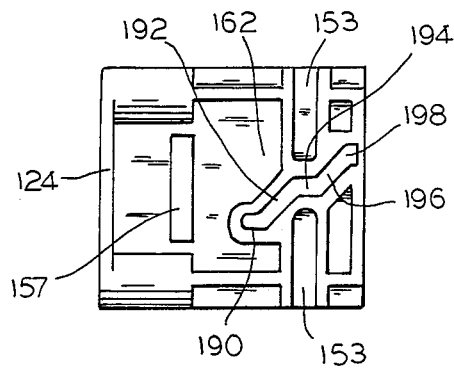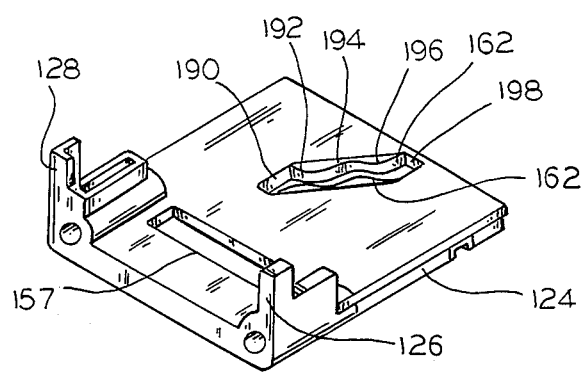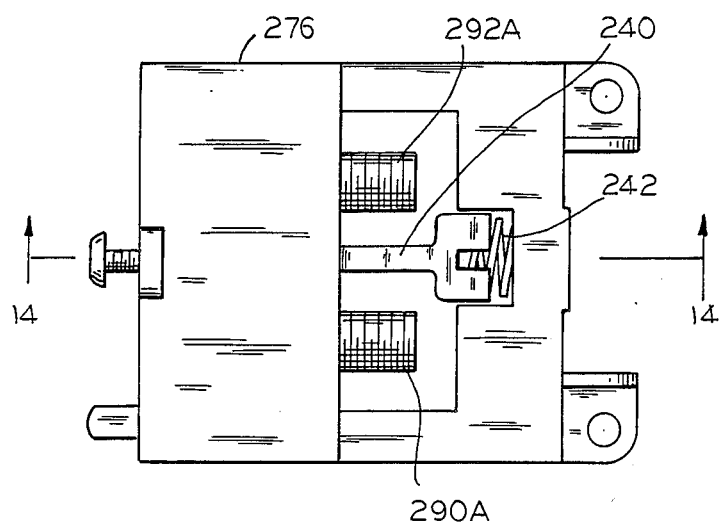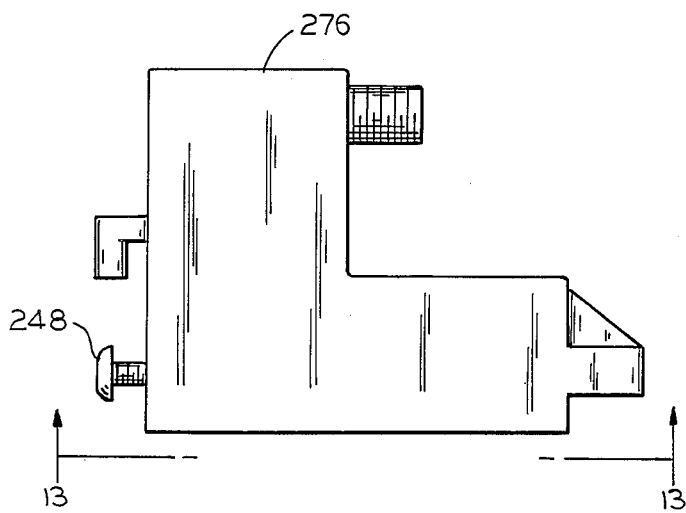
FIG.9
FIG.10
FIG.11
FIG.12

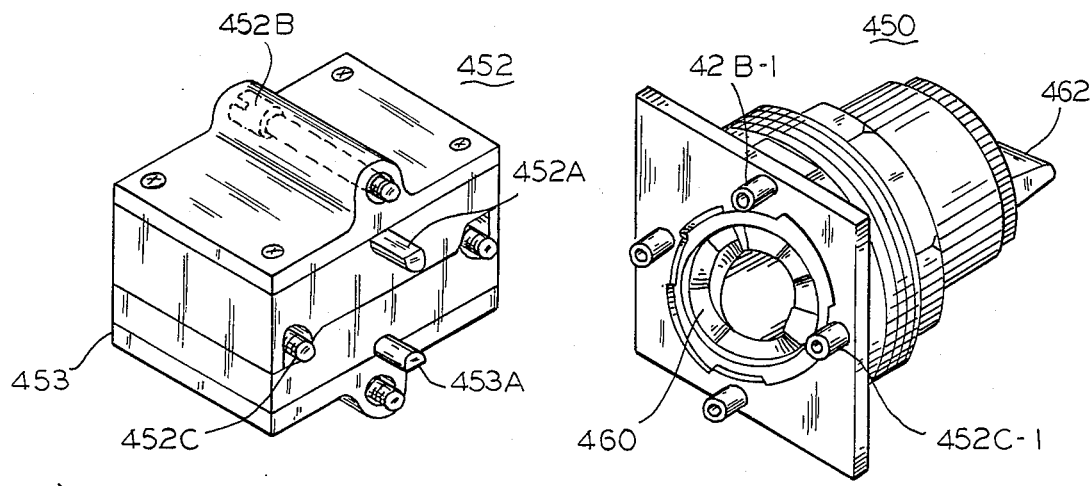
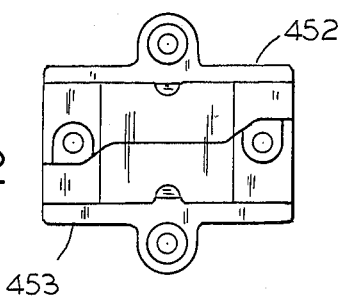
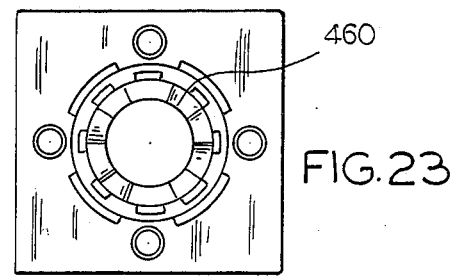
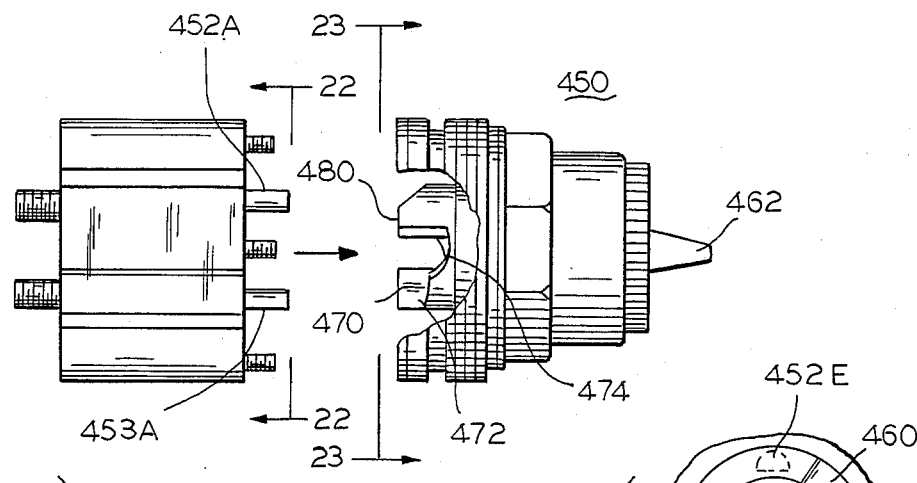
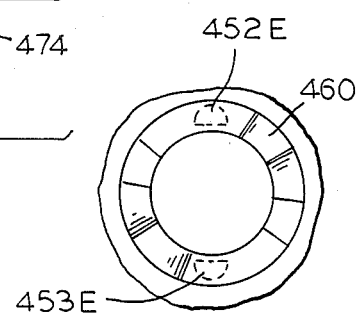

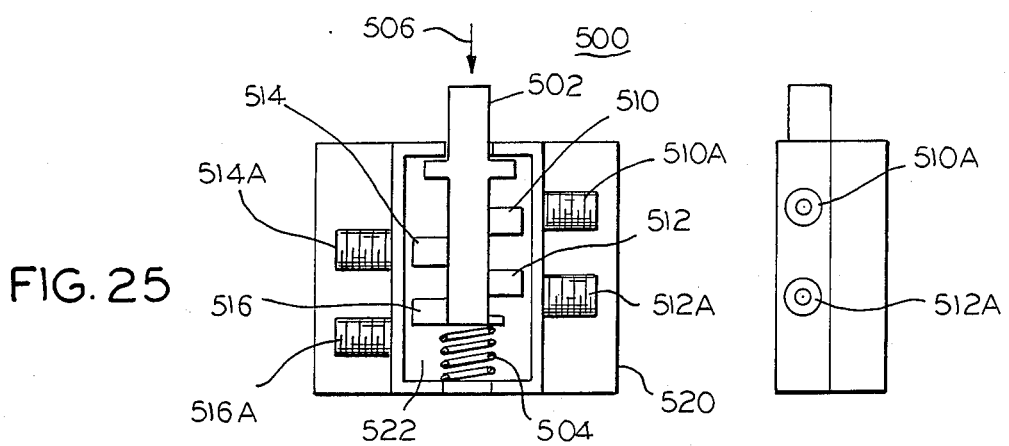
FIG. 25
FIG. 26
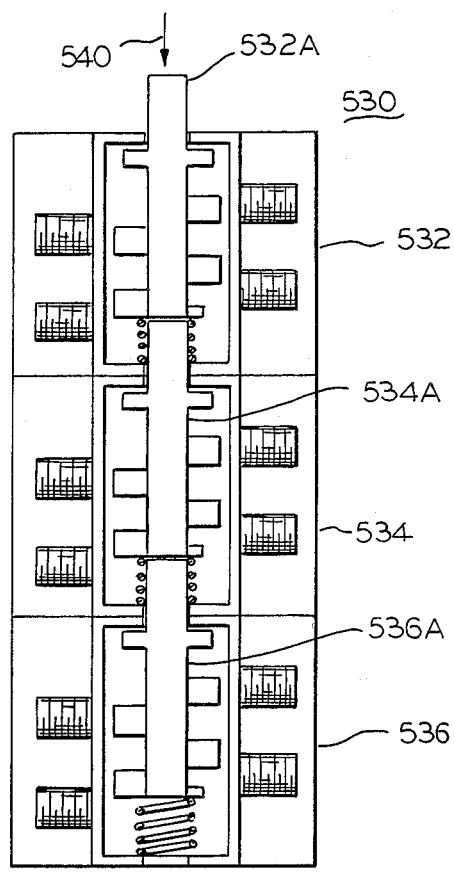
FIG. 27
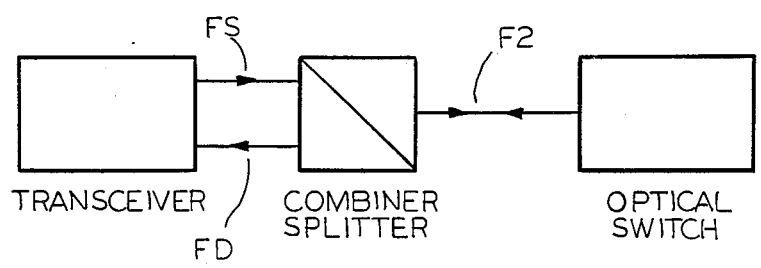
FIG. 28

OPTICAL SWITCH

FIELD OF THE INVENTION

This invention relates to optical switches for use with optical circuits employing fiber optic light conductors.

BACKGROUND OF THE INVENTION

It is convenient to use an optical circuit for control of machine tools in a factory environment in which there is a high background of electrical noise produced, for example, by the starting and stopping of many motors and other electrical background producing devices. Central to the use of an optical circuit for controlling machines in a factory is to have a convenient optical switch which may be used with fiber optic light conductors. One approach to an optical switch for use in the factory environment is shown in U.S. Pat. No. 4,223,217, issued to Bongard, et al. on Sept. 16, 1980. The Bongard, et al. reference shows a shutter mechanism for turning a fiber optic circuit "on" and "off".

The practical use of optical fiber circuits in a factory environment for controlling machine tools requires an easily utilized optical switch. The switch should be capable of both switching an optical circuit from "on" to "off", and simultaneously switching a second optical circuit from "off" to "on". To be useful, such an optical switch must be capable of convenient integration with common machine tool control devices such as push buttons limit switches, pressure responsive switches, and selector switches.

SUMMARY OF THE INVENTION

The invention provides a simple optical switch capable of integration with common machine tool control devices such as push buttons, limit switches, pressure responsive switches, and selector switches. The invention is an optical switch comprising a housing for mounting the optical switch, a drive rod capable of motion, and at least one mirror movable with the drive rod for reflecting light in a desired direction.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 5 is an assembly drawing of a fiber optic switch.

FIG. 6 is and end view of a drive rod.

FIG. 7 and FIG. 8 are sectional views of a fiber optic switch.

FIG. 7A is a detail view of a spring restraint.

FIG. 9 is a bottom view of a slide for a fiber optic switch.

FIG. 10 is an isometric view of a slide for a fiber optic switch.

FIG. 11, FIG. 12, FIG. 13, FIG. 14, and FIG. 15 are top, side, bottom, sectional, and assembly drawings of an alternative embodiment of a fiber optic switch.

FIG. 20 is an isometric drawing showing a rotary selector switch and two optical switches.

FIG. 21 is a side view with cut-away showing a rotary selector switch and two optical switches. FIG. 22 is an end view of two optical switches.

FIG. 23 is an end view of the cam surface of a rotary selector.

FIG. 24 is an end view of the cam surface of a rotary selector.

FIG. 25 is a top view of a further alternative embodiment of the invention.

FIG. 26 is a side view of a further alternative embodiment of the invention.

FIG. 27 shows a stack of optical switches.

FIG. 28 is a block diagram of a system using a combiner-splitter.

DETAILED DESCRIPTION

First Alternative Embodiment

Figure 1:
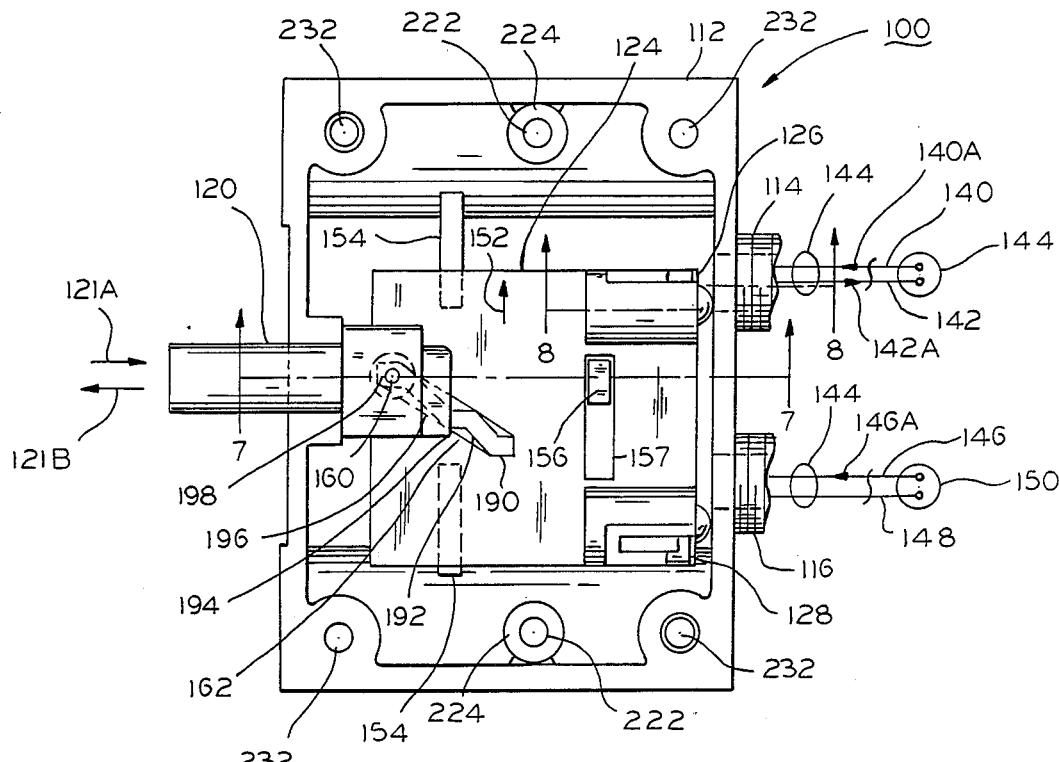
FIG. 1 and FIG. 2 are top views of a fiber optic switch with the cover removed.
Figure 2:
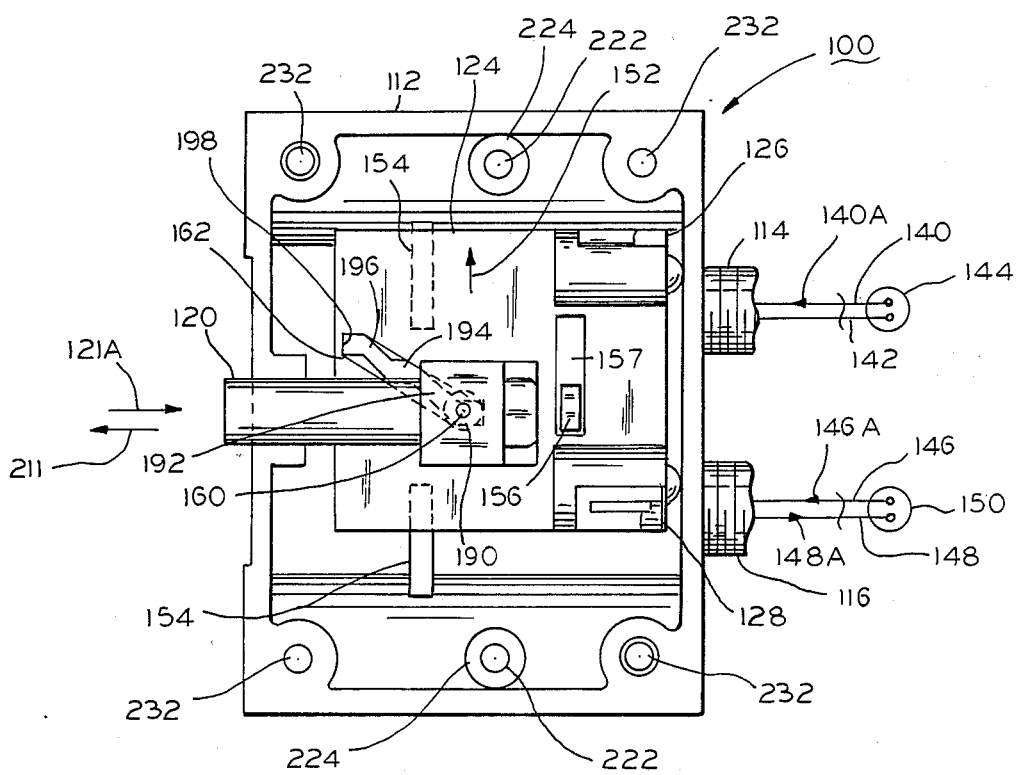

FIG. 1 and FIG. 2 show an optical switch 100. Optical switch 100 has a top 110, shown in FIG. 3 in a top view and in an end view in FIG. 4. Optical switch 100 has a bottom 112. FIG. 1 and FIG. 2 are top views of the optical switch with the cover 110 removed. Threaded connectors 114, 116 provide an attachment for a fiber optic cable.

Drive rod 120 may move into and out of optical switch 100 in the direction shown by arrows 121A and 121B. When drive rod 120 is in the fully "out" position in the direction shown by arrow 121B then it is in the position shown in FIG. 1, and also carrier 124 is in the position shown in FIG. 1. Carrier 124 has mirror surface 126 and mirror surface 128. The mirror surfaces 126, 128 are shown in greater detail in the isometric drawing of FIG. 10. Returning to FIG. 1, optical fiber 140 and optical fiber 142 are optically separate and are contained within optical cable 144. Optical cable 144 is in turn enclosed in a larger protecting sheath 145 (FIG. 17) and attaches by a screw mount to connector 114. Light traveling in optical fiber 140 in the direction shown by arrow 140A reflects from mirror surface 126, and part of the reflected light enters optical fiber 142 where it travels in the direction shown by arrow 142A.

Connector 114, as described above, is a threaded screw connector. Alternatively, a snap on connector or any other type of optical cable connector could serve equally well to attach an optical cable to the switch housing.

With drive rod 120 and carrier 124 in the position shown in FIG. 1, light traveling in optical fiber 146 enters optical switch 100 but strikes no mirror surface 126, 128. Because the light traveling in optical light fiber 146 strikes no mirror surface, only minimal light is reflected and so only minimal light therefore travels in optical fiber 148.

In FIG. 2, drive rod 120 is seen fully extended in the direction shown by arrow 121A. Motion of drive rod 120 in the direction shown by arrow 121A causes carrier 124 to move in the direction shown by arrow 152. Slot 153 (FIG. 5, FIG. 7) in carrier 124 fits over raised tab 154 molded into bottom 112. Also tab 156 is molded into bottom 112 and fits into slot 157 of carrier 124. The function of tab 154 interacting with slot 153 is to restrain movement of carrier 124 to be linear motion in the direction of arrow 152, and the opposite direction.

FIG. 7 shows the interaction between tab 156 and the end of spring 180. The function of tab 156 is to prevent spring 180 from rubbing slide 124. Tab 156 supports the lower side of spring 180 and thereby prevents spring 180 from rubbing against slide 124. Clearance is maintained between tab 156 and slot 157 so that the tab 156 does not interfere with the motion of slide 124.

The motion of carrier 124 in the direction shown by arrow 152, or in the opposite direction, is caused by motion of drive rod 120 in the direction shown by arrow 121A or by arrow 121B. A pin 160 is captured in the end of push rod 120, and inserts into slot 162 of carrier 124. Spring 170 (FIGS. 5, 7) holds pin 160 in contact with carrier 124. As drive rod 120 moves in either direction of arrow 121A or arrow 121B, pin 160 engages a side of slot 162 in carrier 124 and is restrained by slot 155 (FIG. 7) in bottom 112, and thereby forces carrier 124 to move either in the direction shown by arrow 152, or in the opposite direction. Slot 155 is formed in bottom 112 and captures the end of pin 160 in order to stabilize pin 160.

In FIG. 2, carrier 124 is shown fully extended in the direction shown by arrow 152. In FIG. 2, mirror surface 126 is moved away from threaded connector 114. Thus, light traveling in fiber 140 in the direction shown by arrow 140A meets no mirror surface and thus only minimal light is reflected to travel in fiber 142. However, in the position shown in FIG. 2, mirror 128 has moved into position to reflect light traveling in fiber 146 in the direction shown by arrow 146A, and light reflected from mirror 128 enters optical fiber 148 and travels therein in the direction shown by arrow 148A.

Thus, in FIG. 1 the light traveling in fiber 140 is reflected by mirror 126 into fiber 142. Also, in the position shown in FIG. 1, light traveling in fiber 146 is not reflected from a mirror surface and thus only minimal light travels in fiber 148. Thus, in FIG. 1, there is a continuous optical path between fiber 140 and fiber 142. Also, there is a broken optical path between fiber 146 and fiber 148.

With the parts in the position shown in FIG. 2, there is a broken optical connection between fiber 140 and fiber 142. Thus, only minimal light travels in fiber 142 because there is no mirror surface to reflect the light traveling in fiber 140 into fiber 142. However, mirror 128 has moved into position to reflect light traveling in fiber 146 so that it is captured in fiber 148 and travels therein in the direction of arrow 148A.

Thus, in FIG. 1, the optical connection in cable 144 is "on", and the optical connection in cable 150 is "off". In contrast, in FIG. 2, the optical connection in cable 144 is "off", and the optical connection in cable 150 is "on".

Spring 170 (FIGS. 5, 7) fits into cavity 172 of pin 160. Pin 160 in turn fits into cavity 174 of drive rod 120. Spring 170 biases pin 160 to be in contact with carrier 124.

Spring 180 fits onto projection 182 of drive rod 120 as shown in FIGS. 5, 6, and 7. The other end of spring 180 presses against plate 184.

FIG. 7A shows a detail of the restrain of spring 180 by plate 184 and tab 156. Plate 184 and tab 156 form a box for the restraint of the stationary end of spring 180.

Plate 184 is integrally molded with top 110. The purpose of spring 180 is to bias drive rod 120 in the direction shown by arrow 121B. Thus, the relaxes position of the parts of optical switch 100 is for drive rod 120 to be in the position as shown in FIG. 1, and for it to be held thereby the urging of spring 180. Actuation of the optical switch is achieved by depressing drive rod 120 in the direction shown by arrow 121A until the parts assume the position shown in FIG. 2. Thus, in the relaxed position as shown in FIG. 1, the optical connection in cable 144 is "on", and the optical connection in cable 150 is "off". In the actuated position, as shown in FIG. 2, in which drive rod 120 is fully depressed in the direction shown by arrow 121A, the optical circuit in cable 144 is "off" and the optical circuit in cable 150 is "on".

FIG. 6 shows an end view of drive rod 120 showing projection 182. Also, guides 186 are shown. Spring 180 fits into place between the bottom curved edge of projection 182 and the upper curved edges of guides 186.

Slot 162 in carrier 124 has five distinct regions labeled 190, 192, 194, 196, 198. These regions are for the purpose of controlling the motion of carrier 124 in a direction of arrow 152, or the opposite direction, under the influence of the motion of drive rod 120 in the direction of either arrow 121A or 121B. Details of slot 162 are shown in FIG. 1 and FIG. 2, and also in FIG. 9 and FIG. 10. The motion of carrier 124 may be analyzed by reference to FIG. 1 and FIG. 2. Starting in FIG. 1, pin 160 is shown resting in section 198 of slot 162. As drive rod 120 moves in direction of arrow 121A, pin 160 engages a side of region 196, and while engaging region 196 induces motion of carrier 124 in the direction shown by arrow 152. Next pin 160 enters region 194, which region has sides parallel to the direction shown by arrow 12A, and thus motion of carrier 124 does not occur so long as pin 160 remains within region 194. Next pin 160 engages a side of slot 162 within region 192 and therein further urges motion of carrier 124 in the direction shown by arrow 152. Finally, pin 160 enters region 190 of slot 162 at the end of the travel distance of carrier 124. With pin 160 in region 190 carrier, 124 is in the position shown in FIG. 2.

Motion of carrier 124 may be further traced using FIG. 2 as drive rod 120 moves in the direction shown by arrow 121B. First pin 160 engages slot 162 in region 190. As drive rod 120 moves in the direction of arrow 121B, pin 160 first engages a side of slot 162 in region 192 thereby urging motion of carrier 124 in the direction opposite to that of arrow 152, until pin 160 reaches region 194. In region 194, motion of drive rod 120 further in the direction shown by arrow 121B produces no motion of carrier 124. Further motion of drive rod 120 in the direction shown by arrow 121B results in pin 160 engaging a side of slot 162 in region 196 where it further urges motion of carrier 124 in the opposite direction to that shown by arrow 152 until pin 160 reaches region 198 at which point carrier 124 is fully in the position shown in FIG. 1. FIG. 1 shows carrier 124 at the limit of its range of motion in the direction opposite to that shown by arrow 152.

The purpose of having slot 162 have regions 190, 192, 194, 196, and 198 is to allow both optical fibers 144 and 150 to be off during the range of motion of drive rod 120 during which pin 160 is engaged in region 194. When pin 162 is engaged in region 194, both mirror surface 126 and mirror surface 128 are in a position to reflect minimal light into their respective receiving optical fibers. Thus, during the small range of motion of drive rod 120 during which pin 160 is engaged in region 194 both optical fibers are in the "off" state.

Further control of the "off" and "on" state of optical cables 144, 150 is obtained by controlling the diameter 200 (FIG. 5) of pin 160 along with controlling the width of slot 162.

When diameter 200 is made to have a close fit with the width of slot 162 then there is tight coupling between the motion of drive rod 120 and carrier 124. On the other hand, when the diameter 200 is made considerably smaller than the width of slot 162, for example, diameter 200 may be one-half the width of slot 200, then a small hysteresis is introduced into the motion of carrier 124 in response to motion of drive rod 120. That is, for a given position of drive rod 120 the location of carrier 124 will depend upon whether drive rod 120 is moving in the direction of arrow 121A or is moving in the direction of arrow 121B. Such a hysteresis in the motion of drive rod 120 is useful in application in which it is desirable to have a small motion of drive rod 120 to have no effect on the position of carrier 124.

Slot 162 as described hereinabove provides switching of two optical circuits where the "ON" circuit "breaks" before the "OFF" circuit makes. The "break" before "make" function is equivalent to the electrical switching technique known as "Form C." Other switching techniques may be easily obtained by changing the shape of slot 162 and the positions of the mirrors on the carrier. For example, all form types listed in a publication entitled, "Engineers Relay Handbook," published by The National Association of Relay Manufacturers, Elkhart, Ind., Copyright 1965, 1980, at page 6, may be obtained by the Optical Switch. In the "Engineers Relay Handbook" switching Forms A through M and U through Z are set out. By controlling variable such as the slot shape and dimensions, the pin diameter, and the locations of the mirrors on the carrier, all of the switching forms may be obtained by the present invention. Also, these switching forms may be obtained by alternate embodiments of the present invention as described hereinbelow.

Spring 214 and ball bearing 210 also provide a consistent and predetermined distance between mirrors 126 and 128 and the end of cables 114, 150. This predetermined distance allows for the maximum amount of light energy which is reflected by mirrors 126 and 128 to be captured by fibers 142 and 148. The optimum predetermined distance may be experimentally determined and will depend upon parameters of the systems such as the diameter of the optical fibers, the spacing of the optical fibers, whether the optical fibers are a single strand or multiple strands, and other details of the optical cable constructions.

Ball bearings 210 fits into hole 212 and is biased by spring 214 to be in contact with the face 216 of optical switch 100, as shown in FIG. 5, 7 and 8. Further, spring 214 urges tab 154 to bear against the side of slot 153. Spring 214 and ball bearing 210 provide a smooth low friction means for capturing carrier 124 between 216 and tab 154.

Figure 3:
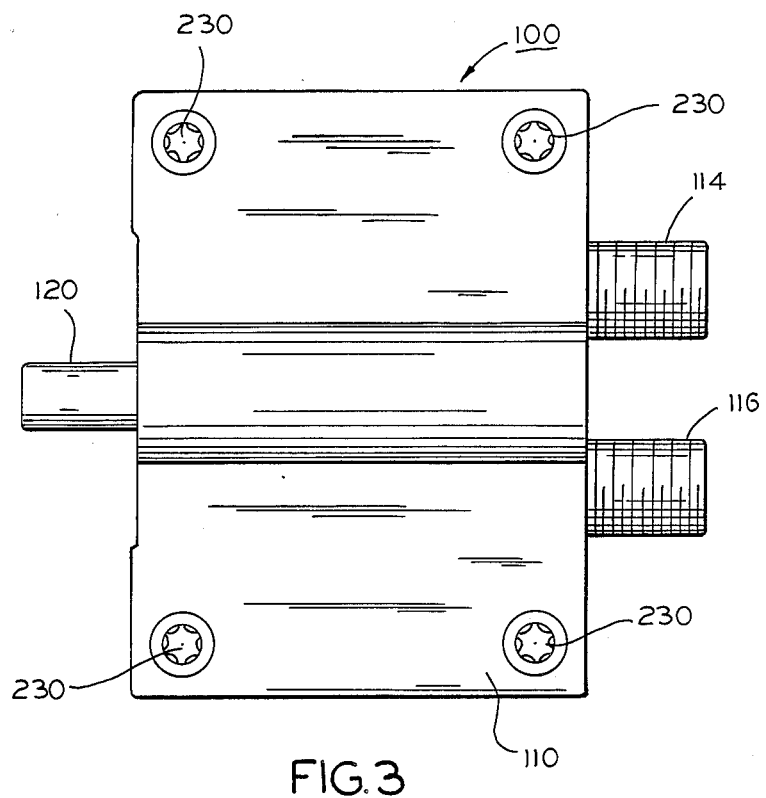
FIG. 3 is a top view of a fiber optic switch.
Figure 4:
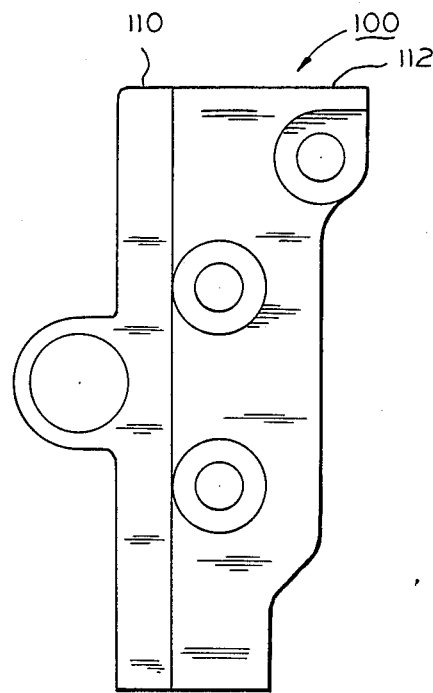
FIG. 4 is an end view of the fiber optic switch.

Locator pin 220 is integrally molded into top 110. Locator pin 220 fits into hole 222 molded into bottom 112 of optical switch 100. The locator pins 220 are tapered as shown in FIG. 5 for ease of assembly of top 110 to bottom 112. Holes 222 may be conveniently molded into bottom 112, and may have a circular external structure 224 as shown in FIG. 1 and FIG. 2. Screws 230 may conveniently be made of metal and have threads which matingly engage holes 232. The threads of screws 230 may conveniently engage the plastic molding forming bottom 112. Also, screws 230 may conveniently have a nonstandard slot such as a star shaped slot as shown in FIG. 3 in order to discourage unauthorized disassembly of the apparatus.

Second Alternative Embodiment

Figure 13:
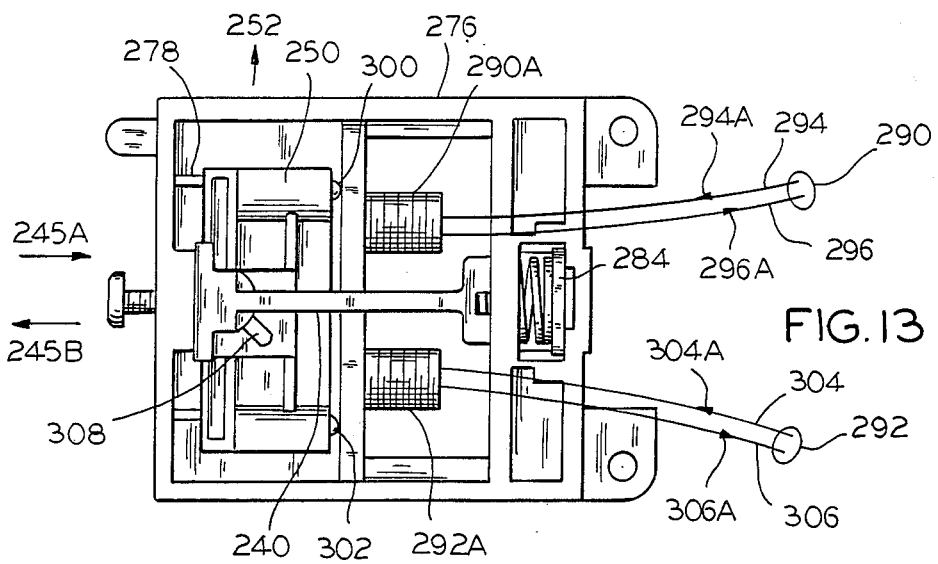
Figure 14:
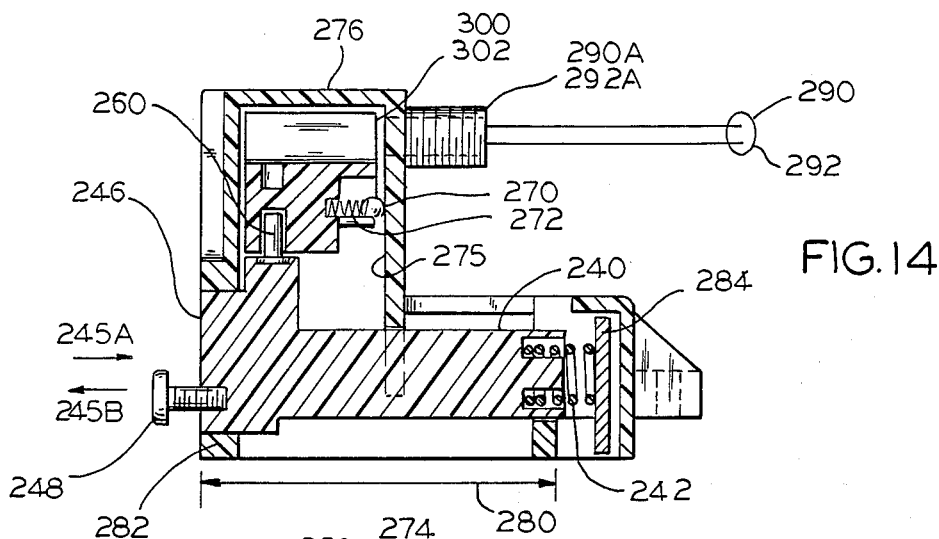

An alternative embodiment of the apparatus is shown in FIGS. 11, 12, 13, 14, and 15. FIG. 11 is a top view of the alternative embodiment and FIG. 12 is a side view. FIG. 14 is a sectional view, as indicated in FIG. 11, and shows drive rod 240 biased into position by spring 242. Drive rod 240 may be moved in the direction of arrow 245A, and in so doing compresses spring 242. Release of force on the end 246 of drive rod 242 allows motion of drive rod 240 in the direction of arrow 245B under the influence of spring 242. Screw 248 may be used for application of force to surface 246 of drive rod 240, and may conveniently be used to adjust the optical switch to fit into a mechanical actuator.

Carrier 250 moves in the direction of arrow 252, or in the opposite direction, under the influence of drive rod 240 moving in the direction of either arrow 245A or arrow 245B. Pin 260 is captured in drive rod 240. A convenient means of capturing pin 260 in drive rod 240 is to force fit head 262 of pin 260 into a mating hole in drive rod 240. Shaft 264 of pin 260 matingly engages slot 266 of carrier 250. Motion of drive rod 240 in either the direction of arrow 245A or arrow 245B causes shaft 264 of pin 260 to engage slot 266 of carrier 250 and induce motion of carrier 250 in the direction shown by arrow 252, or in the opposite direction.

Ball bearing 270 is urged by spring 272, both of which fit into holes 274, to press against surface 275 of housing 276. Also, springs 272 urge carrier 250 to press against ribs 278, and ribs 278 may be conveniently molded integrally with housing 276. Ball bearings 270 provide a smooth and continuous motion of carrier 250 as it travels in the direction of arrow 252, or in the opposite direction.

Length 280 of drive rod 246 may be conveniently chosen so that drive rod 246 may be moved in the direction of arrow 245A sufficiently to disengage from section 282 of housing 276, and thereby provide a means for disassembly of the apparatus. Plate 284 may conveniently be made of metal, and may be captured within housing 276 in order to provide a stable force plate for spring 242. Plate 284 may conveniently have barbs for catching in the material of housing 276 in order to prevent the removal of plate 284 without causing destruction of housing 276.

An alternative choice of the length 280 of drive rod 246 is to make length 280 long enough so that when it is in contact with plate 284 it is too long to clear section 282, and so drive rod 246 cannot be removed from having 276 except by first removing plate 284. This choice of length 280 prevents inadvertent disassembly of the apparatus.

Optical cables 290 and 292 are attached to threaded connectors 290A and 292A, respectively. Optical cable 290 contains optical fiber 294 and optical fiber 296. Optical fiber 294 carries light traveling in direction of arrow 294A into the optical switch. Carrier 250 has mirror surface 302 arranged so that when carrier 250 is in the position shown in the bottom view FIG. 13, then light traveling in optical fiber 294 in the direction of arrow 294A strikes mirror surface 302 and some of the reflected light is captured in optical fiber 296 and travels therein in the direction shown by arrow 296A. Correspondingly, in optical cable 292, optical fiber 304 carries light in the direction shown by arrow 302A into the optical switch. However, in the position shown in FIG. 13, mirror surface 302 is out of position to reflect light for capture in optical fiber 306. Thus, when carrier 250 is in the position shown in FIG. 13, only a minimal amount of light will travel in optical fiber 306 in the direction shown by arrow 306A.

When drive rod 240 is moved fully in the direction shown by arrow 245A then pin 260 is seated in end 308 of slot 266, moving carrier 250 fully in the direction shown by arrow 252. This position is not shown in the figure. In this position, mirror surface 300 is moved away from threaded connector 290A so that mirror surface 300 does not reflect light traveling in optical fiber 294 in the direction shown by arrow 294A. Therefore, only a minimal amount of light will travel in optical fiber 296 in the direction shown by arrow 296A. Further, in this position mirror surface 302 will be moved into position to effectively reflect light traveling in optical fiber 304 in the direction shown by arrow 304A so that some of this light is captured in optical cable 306 and travels therein in the direction shown by arrow 306A. Thus, in this position, the optical circuit of cable 290 will be in the "off" condition, and the optical circuit of cable 292 will be in the "on" condition.

With carrier 250 in the position shown in FIG. 13 with drive rod 240 fully extended in the direction shown by arrow 245B, the optical circuit of cable 290 will be "on" and the optical circuit of cable 292 will be "off".

Figure 15:
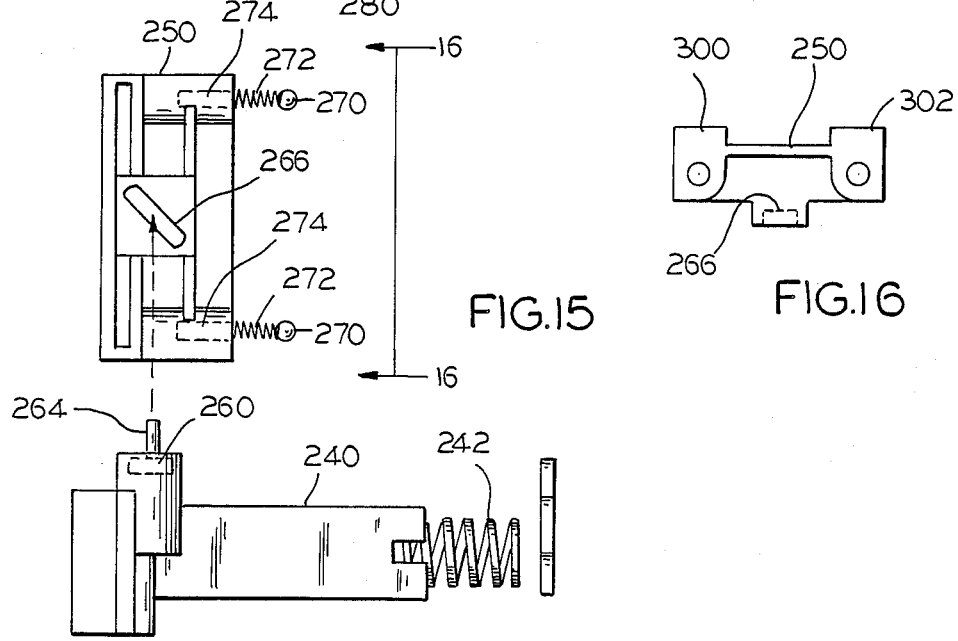
Figure 16:
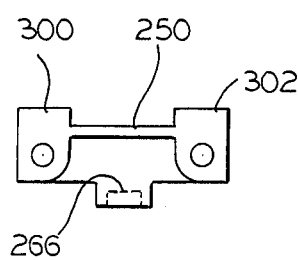
FIG. 16 is an end view of a carrier.

Further details of carrier 250 and mirror surface 300 and 302 are shown in FIG. 16 in an end view of carrier 250. Section lines 16 shown in FIG. 15 show the direction in which FIG. 16 views carrier 250. FIG. 15 shows a bottom view of carrier 250 as it is shown in FIG. 13.

The mirror surfaces of a carrier 124, 250 may be coated by, for example, a metallic layer in order to increase their reflectivity. It has been found convenient to plate the entire carrier using an electrolytic deposition of chromium. The major parts of the embodiments of the invention shown in the figures and discussed herein may be conveniently made out of plastic by an injection molding process.

System

Figure 17:
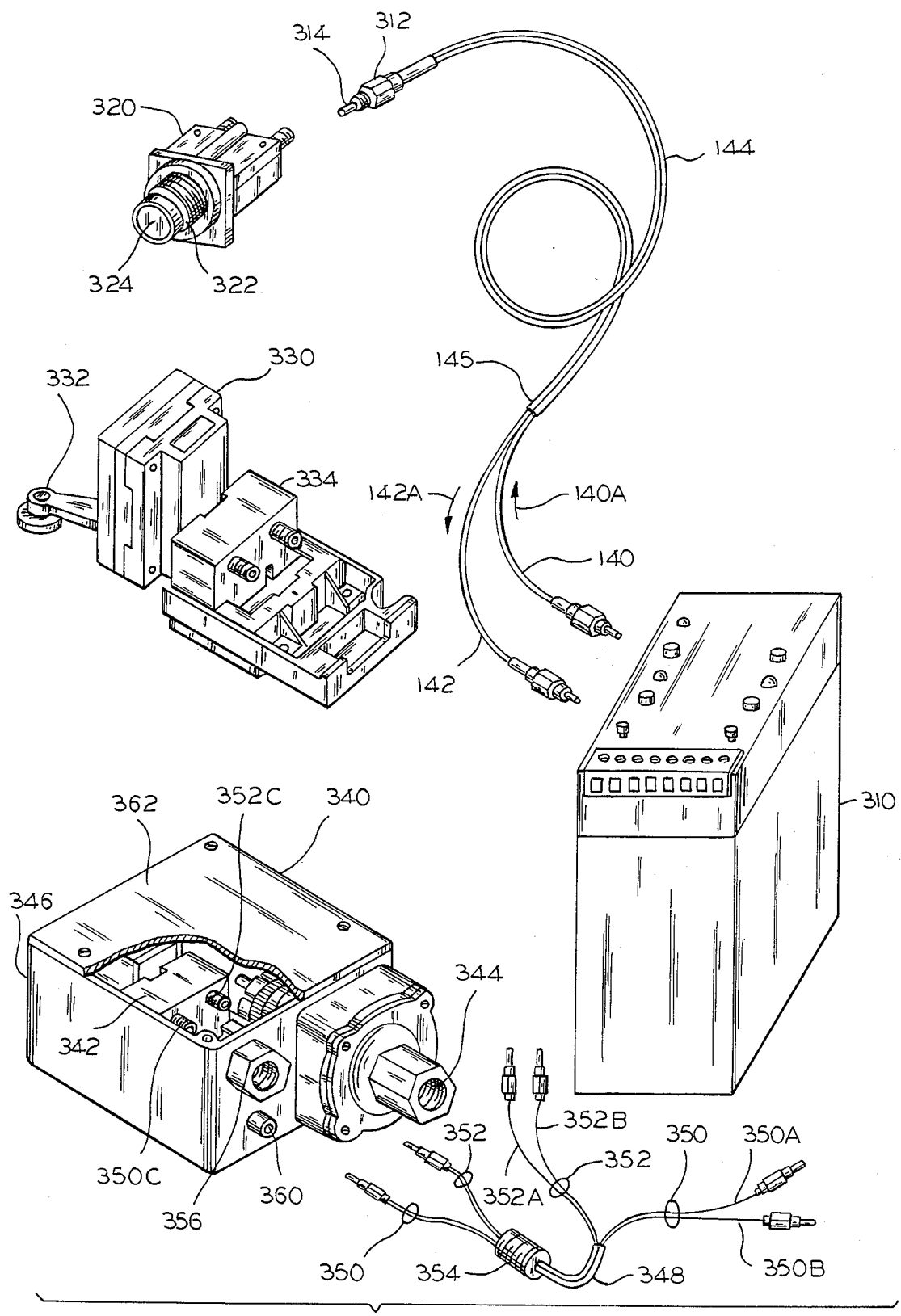
FIG. 17 is a diagram of a system employing a fiber optic switch.

FIG. 17 shows a system exhibiting several embodiments of apparatus utilizing an optical switch. Transceiver 310 contains a light source for generating light traveling in optical fiber 140 in the direction shown by arrow 140A. Also, transceiver 310 contains a light receiver for detecting the light traveling in optical fiber 142 in the direction shown by arrow 142A. Transceiver 310 may also contain a power supply and the necessary electronics to achieve its function. Transceiver 310 may conveniently be configured to provide for only one optical circuit, or may alternatively be configured to accommodate several optical circuits. Optical fibers 140, 142 are joined together to form optical cable 144.

Optical cable 144 attaches by means of screw connector 312 to the threaded connector of an optical switch. both optical fiber 140 and optical fiber 142 are optically coupled through connector 312, and may be conveniently arranged in a parallel configuration in optical end 314.

Optical switch 320 is shown operationally attached to push button 322. The embodiment of the optical switch shown in FIG. 1 through FIG. 10 may be conveniently used as optical switch 320. Mechanically, push button 322 and optical switch 320 are arranged so that depression of operator 324 of the push button depresses drive rod 120 in the direction shown by arrow 121A, as shown in FIG. 1 and FIG. 2. Thus, with the use of a push button having a push button operator 324 at least two optical circuits may be changed from a "on" to a "off" state, or conversely may be changed from a "off" state to a "on" state by simply depressing a push button operator.

An alternative mechanical arrangement for an optical switch is illustrated by limit switch 330. Operating level 332 of limit switch 330 moves in response to the motion of machinery. Operating lever 332 is mechanically coupled to optical switch 334 so as to operate the switch. For example, the embodiment of an optical switch shown in FIGS. 11 through 16 may conveniently be used for optical switch 334. Motion of operating lever 332 is transmitted to screw 248 so as to move drive rod 240 either in the direction shown by arrow 245A or the direction shown by arrow 245B. Thus, operation of operating lever 332 may turn optical circuits from the "on" condition to the "off" condition or in the reverse.

There are many alternate types of limit switches which could serve as a mechanical actuator for an optical switch. For example, the limit switch may be operated by a roller, a plunger, a palm button, or any other convenient type of limit switch. Any operating element of a limit switch may be used to actuate the optical switch.

Pressure actuated switch 340 makes use of an optical switch 342. A liquid or gas may be coupled to screw connector 344. Screw connector 344 leads to a diaphragm and pressure adjustment spring. Movement of the diaphragm against the force exerted by the spring as a result of the pressure of the fluid coupled into screw connector 344 is transmitted to a lever which actuates optical switch 342. For example, the pressure switch disclosed in U.S. Pat. No. 4,168,415, issued to Edwards, Jr. et al. on Sept. 18, 1979, and assigned to the assignee of the present patent application, may be conveniently used for pressure switch 340. The embodiment of the optical switch shown in FIG. 11 through FIG. 16 may conveniently be used for optical switch 342. The lever within pressure switch 340 which moves under the influence of pressure coupled into screw connector 344 applies force to screw 248 of drive rod 240, thereby switching optical circuits from the "on" to the "off" condition, and also may switch optical circuits from the "off" to the "on" condition. Pressure switch 340 is shown mounted in enclosure 346. Optical cable 348 is shown made up of two cables of the type shown as optical cable 144. Cable 350 and cable 352 make up optical cable 348. Optical cable 350 is made up of optical fiber 350A and optical fiber 350B in order to provide a complete optical circuit as is provided by optical cable 144. Correspondingly, optical cable 352 is made up of optical fiber 352A and optical fiber 352B. Optical cable 350 connects to screw connector 350C of optical switch 342. Correspondingly, optical cable 352 connects to screw connector 352C of optical switch 342. Optical cable 348 enters enclosure 346 through a bushing 354. Bushing 354 fits into connector 356 in order to provide a seal, for example, an oil or other liquid tight seal in order to prevent entry of unwanted liquid into the interior of enclosure 346. Nipple 360 may be threaded to accept a screw for holding a chain to retain coverplate 362 of enclosure 346.

Bushing 354 also provides strain relief by acting to prevent the cable from having a bending radius less than its recommended minimum bending radius.

Nipple 360 may be threaded to accept a screw for holding a chain to retain coverplate 362 of enclosure 346.

Many types of pressure switches may serve as a mechanical actuator for an optical switch. For example, a piston operated or bellows type of pressure switch will serve equally well.

Electronics

Figure 18:
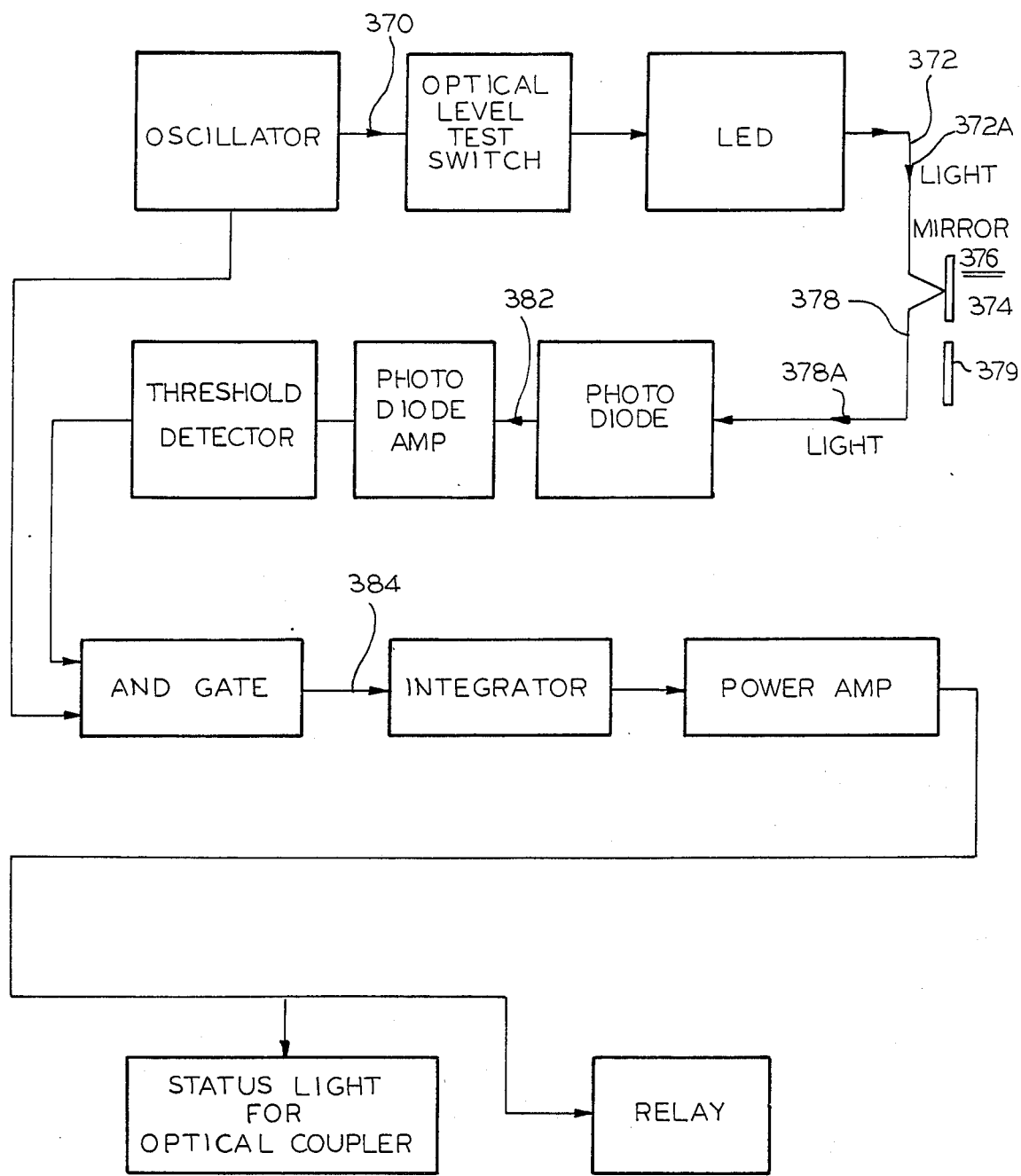
FIG. 18 is a block diagram of a system including a fiber optic switch.

FIG. 18 shows a block diagram of an optical transceiver system suitable for use with an optical switch. The oscillator produces pulses in output line 370 which are coupled to the light emitting diode, labeled LED. The optical pulses in output line 370 pass through optical level test switch. The optical level test switch is capable of reducing the intensity of the light emitted by the LED by adjusting the voltage level of the pulses driving the LED. Light emitted by the LED is picked up by optical fiber 372 and travels therein the direction shown by arrow 372A. The light from optical fiber 372 is directed to a mirror 374. When in position 376 mirror 374 reflects light emitted by optical fiber 372 so that it is captured by optical fiber 378 and travels therein in the direction of arrow 378A. Light traveling in optical fiber 378 is emitted towards and received by the photodiode. Mirror 374 may be moved into position 379, at which position it does not reflect a significant amount of light emitted by optical fiber 372, and so only minimal light travels in optical fiber 378.

The photodiode generates an electrical output 383 which is coupled to the photodiode amplifier. Output of the photodiode amplifier is connected to one input of a two input AND gate. The other input of the AND gate is driven by the oscillator. The AND gate produces an output when a pulse is present from the oscillator and also from the output of the photodiode amplifier. The purpose of the AND gate is to reduce noise in its output 384 by restricting the output to be present only when an optical pulse is expected.

The output 384 of the AND gate is connected to an integrator. The integrator produces a signal which is high when an optical signal is detected by the photodiode and which is low when the photodiode detects no optical signal. The output of the integrator drives a power amplifier which produces an output 390. The output 390 of the power amplifier drives a relay and also a status light for the optical coupler. The relay may control any suitable external electrical circuit.

The output of the photodiode amplifier drives a threshold detector. The threshold detector is adjusted so that it produces an output pulse when the photodiode detectors a strong optical signal, and produces no output pulse when the photodiode detects an optical signal below a threshold value. The threshold detector makes possible discrimination between an optical signal carried by optical fiber 378 that is reflected from mirror 374, and an unwanted optical signal reflected by internal parts of the optical switch when the mirror is in a non-active position such as position 379.

Figure 19:
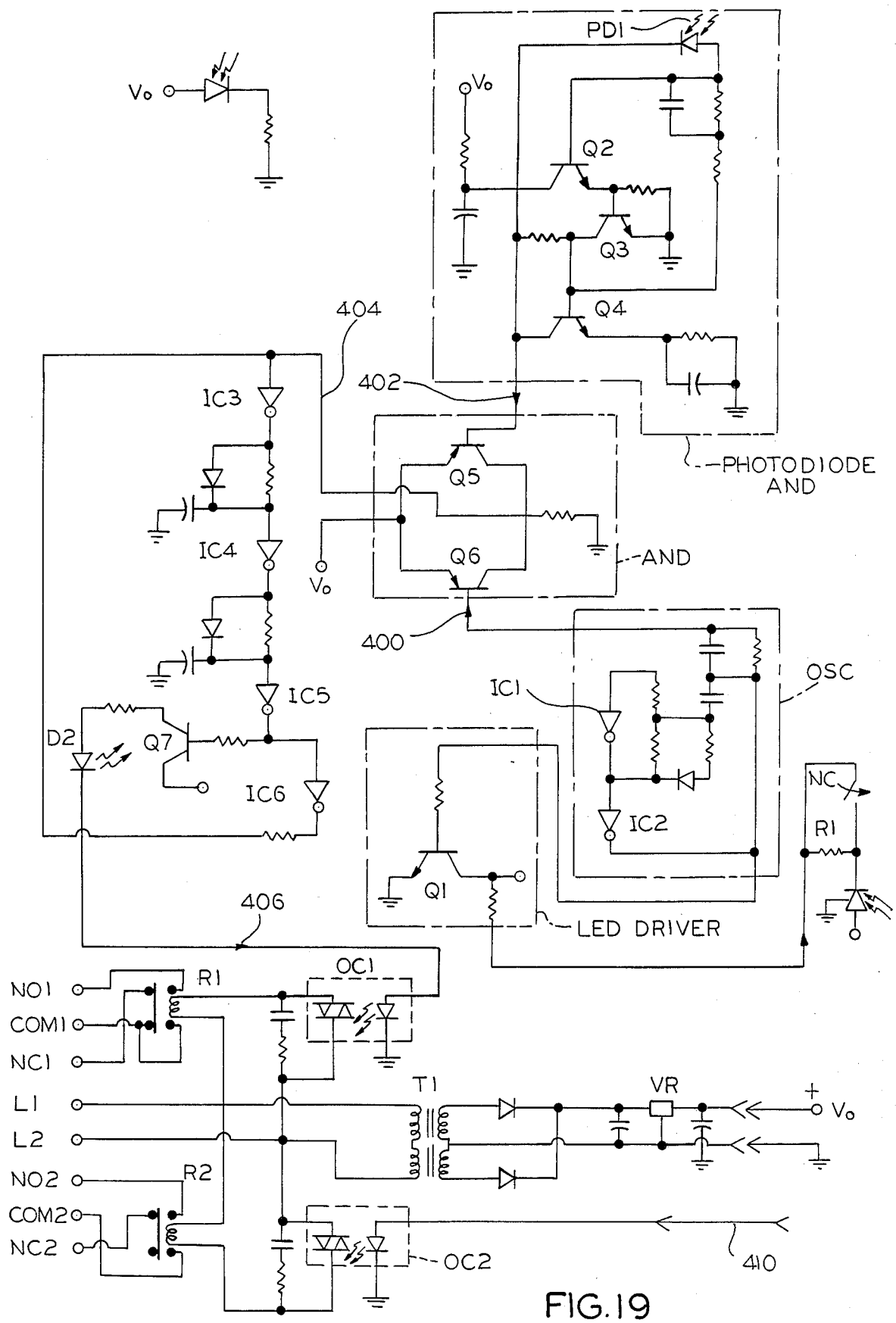
FIG. 19 is a schematic drawing of a light sender and receiver.

FIG. 19 shows a schematic diagram of a transceiver suitable for use with an optical switch. Major sections of the transceiver circuit are segregated by boundary lines. Light output is provided by a light emitting diode (LED). The oscillator OSC produces output pulses which drive the LED driver transistor Q1. The oscillator is made up from integrated circuits IC1 and IC2. Transistor Q1 in turn drives the output LED. It is convenient to have the oscillator drive the output LED so that it produces optical pulses at a frequency of about 450 Hertz where the pulses have a duration of around 10 microseconds. Integrated circuits IC1 and IC2 are Schmitt triggers with an inverter.

A fiber optical light guide is optically coupled to the output LED. For example, optical fiber 140 as shown in FIG. 17 could be coupled to the output LED.

An optical circuit test function is provided by switch S1. Switch S1 is a normally closed switch. When switch S1 is depressed resistor R1 is put in series with the output LED, thereby diminishing the intensity of the output light from the output LED. It is convenient to be able to reduce the intensity of the output light in order to confirm that the total optical loss does not result in marginal operation. If the system operates properly with the switch depressed, then the user is assured that without the switch depressed, the system is not operating marginally.

The oscillator also has an output 400 coupled to an input of an AND gate made up of transistors Q5 and Q6. The oscillator is coupled to the base of transistor Q6.

A photodiode light detector PD1 is optically coupled to an input fiber optical light conductor. For example, photodiode PD1 could be coupled to optical fiber 142 as shown in FIG. 17. Photodiode PD1 serves to detect incoming light pulses. The photodiode amplifier is made up of transistors Q2, Q3 and Q4. Output 402 of the photodiode amplifier connects to the AND circuit at the base of transistor Q5.

The AND circuit is made up of transistors Q5 and Q6. when pulses arrive at output 400 of the oscillator at the base of transistor Q6 and also arrive at the output 402 of the photodiode amplifier at the base of transistor Q5 then the AND circuit generates an output 404. The AND circuit does not generate an output unless pulses are simultaneously present at both point 400 and point 402.

Output 404 of the AND circuit is connected to an integrator. The integrator is made up of integrated circuits IC3, IC4, IC5, and IC6. Each of the integrated circuits IC3, IC4, IC5, and (C6 are Schmitt triggers with an inverter. The six Schmitt triggers with inverters may be conveniently part of a single integrated circuit chip known as a hex Schmitt trigger such as No. CD 40106B made by Radio Corporation of America, RCA, or No. MC14584B made by Motorola.

The output 404 of the AND gate is dependent upon the intensity of the light striking photodiode PD1, so long as a pulse from the oscillator is simultaneously present at the base of transistor Q6. The Schmitt trigger of IC3 then serves as a discriminator requiring light greater than a threshold intensity to activate photodiode PD1 before the Schmitt trigger of IC3 changes state.

The output of the integrator drives transistor Q7. Transistor Q7 serves as a driver for the purpose of driving optical coupler OC1, and also status light diode D2.

Optical coupler OC1 connects the coil of relay R1 to a source of electrical energy. Lines L1 and L2 are connected to a source of electrical energy, for example, 110 volts alternating current. The coil of relay R1 is energized when a signal is applied to optical coupler OC1 by line 406. Output 406 of the output amplifier causes the internal LED of optical coupler OC1 to emit light which in turn closes a solid state switch energizing the coil of relay R1. Relay R1 may then control external circuits through its contacts. The output of the transceiver shown in FIG. 19 occurs through the normally open NO1 or normally closed NC1 contacts of relay R1. Optical coupler OC1 helps to prevent electrical noise from disturbing the electronic circuits.

Transformer T1 is coupled to a rectifier and voltage regulator VR so as to provide a regulated positive DC output voltage at point VO. Point VO is in turn connected to appropriate points within the transceiver in order to provide direct current to the circuit components.

Also shown connected to the power supply is relay R2 having a common connector COM2 and normally open contacts NO2 and normally closed contacts NC2. The coil of relay R2 is energized by optical coupler OC2 when a suitable electrical signal is applied to line 410. Relay R2 provides an output for a second optical circuit (not shown). Relay R2 may be conveniently driven by a circuit similar to the transceiver shown driving relay R1 through optical coupler OC1. Also, any convenient number of transceivers may be operated to accommodate an appropriate number of optical switches.

The circuit shown in FIG. 19 is not immune to steady (DC) light because the photodiode amplifier is DC coupled, and the photodiode amplifier is DC coupled to the AND gate. Thus, steady illumination of the photodiode may allow oscillator pulses to be integrated at IC3. The use of a DC coupled photodiode amplifier has been found satisfactory because of the high sensitivity which it offers. However, the photodetectors must be shielded from steady light sources.

Rotary Selector Switch

FIG. 20 is an isometric view showing a rotary operator 450 and two optical switches 452 and 453. The optical switches 452, 453 are of the embodiment shown in FIG. 1–FIG. 10. Optical switch 452 has drive rod 452A. Optical switch 453 has drive rod 453A. The drive rods are operated by rotary selector operator 450 through the interaction of drive rods 452A, 453A with the cam surfaces 460 of the rotary operator 450. Mounting screws 452B and 452C are captured within the housing of optical switch 452. The mounting screws screw into threaded seats 452B-1 and 452C-1, respectively. Also mounting screws captured in the housing of optical switch 453 and mate with corresponding threaded seats. Rotation of knob 462 causes rotation of cam surfaces 460.

FIG. 21 shows in greater detail the interaction between drive rods 452A an 453A interacting with the cam surfaces of the rotary operator 450. Surface 470 is a high point of the cam surfaces 460, and when pressing directly against a drive rod such as drive rod 453A, moves drive rod 453A into the fully inserted position. As knob 462 is rotated drive rod 453A next engages surface 472, thereby permitting drive rod 453A to move into the intermediate position under the influence of a spring such a spring 180 (not shown in FIG. 21). Further, rotation of knob 462 allows drive rod 453A to interact with surface 474, thereby permitting drive rod 453A to move into the fully extending position under the influence of a spring such as spring 180.

The cam surfaces are arranged so that when drive rod 453A is on a high surface such as 470 then drive rod 452A interacts with a low surface such as surface 474, the proper surface being hidden behind surface 474 and is not shown in FIG. 21. When knob 462 is rotated so that drive rod 453A presses against surface 474, then drive rod 452A rests on a high surface 480 and so is in the fully inserted position. Rotation of knob 462 causes drive rod 452A to move from a fully extended position and drive rod 453A to move from a fully inserted position to the respective opposite positions. Thus, rotation of knob 462 causes optical switch 452 and optical switch 453 to switch between their respective opposite positions. Alternative arrangements of the cam surfaces may be used to develop different relay "Form" switching as discussed hereinabove.

FIG. 22 is an end view of the two optical switches 452 and 453. The view shown in FIG. 22 is shown in the sectional lines in FIG. 21. FIG. 23 is an end view of the cam surfaces 460 of rotary selector operator 450. FIG. 24 is also an end view of the cam's surfaces 460 of rotary operator 450, but also shows the ends 452E and 453E of drive rods 452A and 453A, respectively. The outlines of the ends of the drive rod show how the drive rods mate against the cam surfaces 460.

Rotary operator 450 provides the function of switching two optical switches simultaneously. Thus, the rotary selector operator 450 can be used to switch four separate optical circuits. Each optical switch controls two optical circuits giving a total of four optical circuits. The optical switches are attached to the rotary part of the operator by mounting screws which are captured within the plastic housing of the optical switches.

Third Alternative Embodiment

FIG. 25 and FIG. 26 show a further embodiment of the invention. Optical switch 500 has drive rod 502. Drive rod 502 is biased into the position shown in FIG. 5 by spring 504. Drive rod 502 may be moved in the direction shown by arrow 506. Motion of drive rod 502 in the direction shown by arrow 506 results in compression of spring 504. The removal of force from drive rod 502 in the direction of arrow 506 allows spring 504 to return the drive rod into the position shown in FIG. 25.

Drive rod 506 has four mirror surfaces, 510, 512, 514, and 516. Connectors 510A, 512A, 514A, 516A provide attachment of optical fibers to the optical switch. In normal use an optical cable containing two optical fibers would be connected to each of the connectors 510A, 512A, 514A, and 516A. Each of the connectors has two optical fibers connected thereto, one of the fibers carrying light toward its respective mirror, and the other optical fiber carrying light reflected by the mirror, the reflected light traveling away from the switch.

In FIG. 25 drive rod 506 is shown in a position in which light is reflected from mirror 510 from the incoming optical fiber into the outgoing optical fiber. However, mirror 512 is in a position so that light entering on incoming fiber at connector 512A is not reflected, or is only minimally reflected, into the outgoing optical fiber connected to connector 512A. Similarly, mirror 514 is in a position to reflect light entering on incoming fiber connected at connector 514A into the outgoing fiber connected to connector 514A. Also, similarly, light entering on incoming fiber connected at connector 516A substantially misses mirror 516, and so no, or only minimal, light is reflected into the outgoing fiber connected at connector 516A.

When drive rod 502 is moved in the direction shown by arrow 506 so as to compress spring 504, the roles of the mirrors are exchanged, and optical circuits which are "On" are turned "Off", and also optical circuits which were "Off" are turned "On". In particular, in the inserted position of drive rod 506 mirror 510 will be moved out of position and will not reflect a substantial amount of light into the outgoing optical fiber connected at connector 510A. However, mirror 512 will be moved into position to reflect a substantial quantity of the light entering connector 512A through the incoming optical fiber into the outgoing optical fiber. Also, mirror 514 will be moved out of position to reflect light into the outgoing fiber entering through connector 514A. However, mirror 516 will be moved into a reflecting position so that light entering at connector 516A on the incoming fiber will be reflected into the outgoing fiber connected at connector 516A.

FIG. 26 is a side view of the apparatus showing connector 510A and connector 512A. The connectors 510A, 512A, 514A, 516A may conveniently be circular in cross section and have threads formed in their outside surface for convenient engagement with an optical cable containing both the incoming and outgoing optical fibers.

The housing 520 of optical switch 500 may conveniently be made out of molded plastic. Also, the connectors 510A, 512A, 514A, 516A may be conveniently made as integrally molded parts of housing 520.

Drive rod 506 may be held by guides (not shown) so that its motion is linear in the direction shown by arrow 506. A cover (not shown) may be attached over the drive rod containing cavity 522.

Several optical switches of the invention as shown in FIG. 25 and 26 may conveniently be stacked together in order to make a controller for a multiple number of optical circuits.

FIG. 27 shows a stack 530 of optical switches 532, 534, 536. Optical switch 532 has push rod 532A. Optical switch 534 has push rod 534A. Optical switch 536 has push rod 536A. Push rods 532A, 534A, 536A may all be moved into the inserted position in the direction shown by arrow 540, by a single mechanical actuator (not shown). Such a mechanical actuator could be connected to a push button, or a rotary selector switch, or some other convenient mechanical actuator. A stacked block of optical switches such as shown in FIG. 27 is convenient for controlling a large number of optical circuits by a single mechanical motion.

Alternative Structures

The parts of the optical switch may be made out of plastic. A convenient means of making plastic parts for an optical switch of the present invention injection molding. The threaded connectors 114, 116 may be molded integrally with the bottom 112 of a housing for an optical switch, as shown in FIG. 1. Likewise, the threaded connectors 290A and 292A shown in FIG. 11 may be integrally molded with the housing 291 of the optical switch, as may be the connectors shown in FIG. 25.

The connectors for attaching an optical cable to the switch may be threaded to take a screw connection, as described hereinabove. Alternatively, the connectors may be of the snap-on type, or any other convenient optical cable connector.

A mirror surface such a surfaces 126, 128 and surfaces 300, 302 as shown in FIGS. 1 and 13, and surfaces 510, 512, 514, 516 as shown in FIG. 25 may be molded plastic surfaces. Alternatively, the surfaces may be metal coated plastic surfaces. Chromium has been found to provide a particularly useful coating. As an alternative, any convenient material which reflects light may be used as the mirror surfaces. Of course, the better reflecting surface will allow the use of a longer optical cable. The mirrors shown herein above are front surface mirrors.

An alternative embodiment of the invention may use an optical combiner splitter to combine into one fiber the light transmitted to the mirror and conduct reflected light away from the mirror. As described hereinabove, one optical fiber, or bundle of fibers, conducts light from the LED light source to the mirror, and a second optical fiber, or bundle of fibers conducts light from the mirror to the photodetector. By use of the combiner-splitter a single optical fiber, or fiber bundle, may be used to make the connection to the optical switch. The combiner-splitter may be located within the transceiver housing. Alternatively, the combiner-splitter may be connected in the optical cable. FIG. 28 shows a combiner-splitter connected within the optical cable. Fibers FS carry optical pulses from the light source in the transceiver to the combiner-splitter, and fibers FD carry optical pulses from the combiner-splitter to the photodetector in the transceiver. Fiber F2 carries optical pulses both "to" and "from" the optical switch in their round trip between the combiner-splitter and the optical switch. This arrangement has the advantage that only a single run of fiber is needed to the optical switch. However, the arrangement has the disadvantage that light intensity is lost in the combiner-splitter.

The optical fibers for carrying light pulses may be single fibers. Or alternatively, the optical fibers may be bundles of fibers. An optical cable having bundles of fibers for carrying light pulses both toward and away from an optical switch would typically contain two bundles of fibers made into a single connector. In the cable, one bundle is for guiding light to the mirror of the switch, and the other bundle is for guiding light reflected by the mirror to the photodetector.

EXAMPLE

Light intensity measurements were made on a typical exemplary system. A system was connected as partially illustrated in FIG. 17. An outgoing optical cable 140 was attached to transceiver 310. The cable was attached to an optical switch. The switch was arranged so that it could be actuated by a push button, by a rotary selector switch, or by hand. Optical intensity measurements were made at the connection end of return optical fiber 142. The optical intensity measurements were made in decibels relative to a one (1) milliwatt standard light source. The measurements were made using a Fiber Optic Multi-Meter Model No. 22XLC manufactured by Phototype, Inc., of Newbury Park, Calif. The abbreviation dBm is used to indicate the measurements relative to a one milliwatt light source, and dB to indicate decibels. The fiber optical cable used had an attenuation of approximately of 6 db per 1,000 meters (6 db per kilometer, km). The measurements were done with a 20 meter length of cable which had a 40 meter round trip distance. The switching point of the receiver was found to be at a light intensity of −62 dBm. Table I gives the results of the measurements with the transceiver off, in which condition the meter read mainly meter noise of −96 dBm, and with various combinations of the optical elements. The switch in mid-position is with the drive rod pin in position 194 of the slot in the carrier, as described hereinabove.

TABLE 1

| Condition | Light Intensity Measurements Length of cable: 20 meters one way, 40 meters round trip<br>Measured intensity decibels referenced to one milliwatt (dBm) |
|---|---|
| Transceiver Off | −96 |
| Transceiver On - Switch Off | −70 |
| Transceiver On - Switch Mid-Position | −70 |
| Switching Point of Transceiver | −62 |
| Transceiver On - Switch On | −45 |
| Transmitter into meter | −25 |

The maximum length of cable usable in this exemplary embodiment of the invention may be calculated on the basis of this data as follows:

$$\text{Head Room} = \text{(Transmitter into Meter)} - \text{(Switching Point)}$$
$$= -25 - (-62) = +37 \text{ dB}$$

From the calculated Head Room the theoretical maximum length of cable is $$= ((\text{Head Room}) - (\text{Fixed Loss}))/(\text{Loss/Length})$$
$$\text{Fixed Loss} = \text{(Transmitter into Meter)} - \text{(Transceiver On, Switch On)}$$
$$= -25 - (-45) \text{dB}$$
$$\text{Fixed Loss} = -25 - (-45) \text{ dB}$$

Theoretical maximum length of cable is $$= (37 - 20)/(2 \times 6 \text{ dB/km})$$
$$= 1{,}500 \text{ meters}$$

Thus, the theoretical maximum cable length in this exemplary embodiment of the invention is approximately 1,500 meters.

If a requirement is made that the system operate reliably with the push to test button depressed, then the head room is reduced by 3 dB. The 3 dB reduction is a result of choosing to have the push to test button reduce the intensity of the output LED by a factor of 2. With a margin of 3 db for reliable operation the length of cable is reduced by $\frac{1}{2} \times 3$ db/(6 dm/km) or 250 meters. The factor of $\frac{1}{2}$ comes from round trip travel of the light in the cable. With the above exemplary embodiment of the invention the longest useful two way cable becomes 1,250 meters.

It is to be understood that the above described embodiments are simply illustrative of the principles of the invention. Various other modifications and changes may be made by those skilled in the art which will embody the principles of the invention and fall within the spirit and scope thereof.

We claim:

1. an optical switch comprising:
 a housing;
 at least one mirror mounted within said housing;
 a drive rod, said at least one mirror mounted upon said drive rod, said drive rod capable of linear motion so that in at least one position of said drive rod said at least one mirror is capable of reflecting light in a desired direction; and
 means for attaching both a first optical fiber and a second optical fiber to said housing so that at least some of the light entering said housing from said first optical fiber may be reflected from said mirror and travel in said second optical fiber in at one position of said mirror, and said mirror may be moved to reduce the intensity of said light reflected into said second optical fiber.

2. An optical switch comprising:
 a housing;
 at least one mirror mounted within said housing;
 a drive rod capable of motion in a first direction;
 a carrier mounted within said housing, said at least one mirror attached to said carrier, said carrier capable of motion in a second direction and responsive to motion of said drive rod, and motion of said drive rod in said first direction results in motion of said carrier in said second direction, so that said at least one mirror may reflect light in a desired direction in at least one position of said carrier; and
 means for attaching both a first optical fiber and a second optical fiber to said housing so that least some of the light entering said housing from said first optical fiber may be reflected from said mirror and travel in said second optical fiber in at least one position of said mirror, and said mirror may be moved to reduce the intensity of said light reflected into said second optical fiber.

3. An optical switch comprising:
 a housing for mounting said optical switch;
 a drive rod capable of motion in a first direction;
 a pin mounted in said drive rod, said pin having a predetermined diameter;
 a carrier capable of motion in a second direction and responsive to motion of said drive rod so that motion of said drive rod in said first direction results in motion of said carrier in said second direction; said carrier having
 a groove cut into said carrier and having a direction component in said first direction and having a direction component in said second direction and having a width greater than said diameter of said pin so that motion of said drive rod in said first direction does not produce motion of said carrier in said second direction during the range of motion of said drive rod in which said pin is out of contact with a side of said groove, thereby providing a dead band in the optical characteristics of said switch as said drive rod moves in said first direction, and,
 at least one mirror surface movable with said carrier for reflecting light in a desired direction in at least one position of said carrier.

4. An optical switch comprising:
 a housing for mounting said optical switch;
 a tab attached to said housing,
 a drive rod capable of motion in a first direction;
 a pin attached to said drive rod, and,
 a carrier capable of motion in a second direction and responsive to motion of said drive rod so that motion of said drive rod in said first direction results in motion of said carrier in said second direction; wherein said carrier is a molded plastic part having two mirror surfaces movable with said carrier for reflecting light in a desired direction, at least one of said mirrors reflecting light in a desired direction in at least one position of said carrier, said carrier having a first groove for mating with said pin, a second groove for restraining motion of said carrier in said second direction in interaction with said tab so that motion of said drive rod in said first direction results in motion of said carrier in said second direction.

5. An optical switch comprising:

a housing for mounting said optical switch;

a drive rod capable of motion in a first direction;

a carrier capable of motion in a second direction and responsive to motion of said drive rod so that motion of said drive rod in said first direction results in motion of said carrier in said second direction;

at least one mirror surface movable with said carrier for reflecting light in a desired direction in at least one position of said carrier, wherein said at least one mirror surface is a first mirror surface and a second mirror surface; and, a first optical cable and a second optical cable; each having an input optical fiber and an output optical fiber, and wherein said first and second optical cables are attached to the housing so that when said carrier is in a first position light is reflected by said first mirror surface from its associated input optical fiber into its associated output optical fiber in said first optical cable and only light below a predetermined level is reflected by parts of said switch into said output fiber in said second optical cable;

and when said carrier is in a second position light is reflected by said second mirror surface from its associated input optical fiber into its associated output optical fiber in said second optical cable and only light below a predetermined level is reflected by parts of said switch into said output fiber in said first optical cable; whereby at said first position said first optical cable is turned ON and said second optical cable is turned OFF, and at said second position said first optical cable is turned OFF and said second optical cable is turned ON.

* * * * *

UNITED STATES PATENT AND TRADEMARK OFFICE
CERTIFICATE OF CORRECTION

PATENT NO. : 4,878,729

DATED : November 7, 1989

INVENTOR(S) : David G. Stewart

It is certified that error appears in the above—identified patent and that said Letters Patent is hereby corrected as shown below:

On the title page:
In the inventor description, please insert -- Edwin R. Newell, Fletcher, NC; Stanley H. Edwards Jr., Asheville, NC; and Myron A. Noth, Asheville, NC --.

Signed and Sealed this

Eighteenth Day of December, 1990

Attest:

HARRY F. MANBECK, JR.

*Attesting Officer*  *Commissioner of Patents and Trademarks*